C. R. SPEIGHT.
EXPANSION JOINT.
APPLICATION FILED SEPT. 22, 1910.

1,006,507.

Patented Oct. 24, 1911.

WITNESSES
G. M. Spring.
L. E. Barkley.

INVENTOR
Crittenden R. Speight.
by Frank A. Hubleman
Attorney

UNITED STATES PATENT OFFICE.

CRITTENDEN R. SPEIGHT, OF BURGAW, NORTH CAROLINA.

EXPANSION-JOINT.

1,006,507.

Specification of Letters Patent. Patented Oct. 24, 1911.

Application filed September 22, 1910. Serial No. 583,288.

*To all whom it may concern:*

Be it known that I, CRITTENDEN R. SPEIGHT, a citizen of the United States of America, and resident of Burgaw, in the county of Pender and State of North Carolina, have invented certain new and useful Improvements in Expansion-Joints, of which the following is a specification.

This invention relates to water distribution and particularly to a pipe coupling, the invention relating specifically to means for coupling pipes of unequal diameters, the same being known ordinarily as an expansion joint.

An object of this invention is to provide novel means for connecting pipes of unequal sizes and the principle involved may be utilized in connection with pipes of greatly different diameters or where the sizes differ but minutely, but it will be obvious from the following description of the invention that the utility of the device in its practical application will be very great when used in connection with heating apparatus or dry kilns as it has been successfully used in kilns prior to this application.

A further object of this invention is to provide a joint, the parts of which are readily assembled, means being provided for effecting a steam tight joint between the sections of piping in such a manner that the joint will withstand unusual pressure without leaking.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
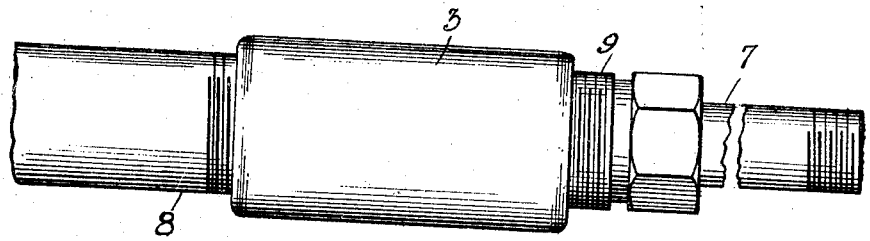
Figure 2:
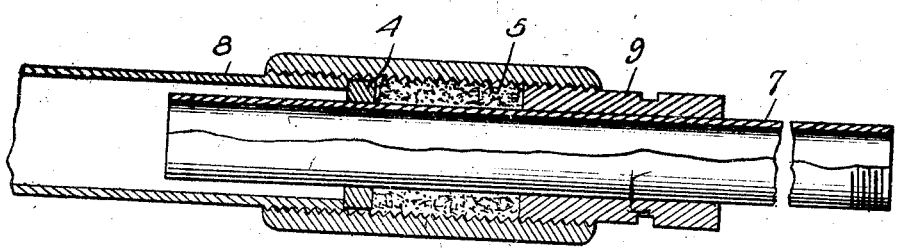

Figure 1 illustrates a view in elevation of a pipe coupling showing fragments of two pipes of unequal diameters which are applied to the ends of the coupling; and Fig. 2 illustrates a longitudinal vertical sectional view of the parts shown in Fig. 1.

In these drawings 3 denotes the coupling proper which is here shown as being of tubular construction, having internal screw threads. Within the coupling 3 is a ring 4 which acts as an abutment for packing 5 which is between the ring 4 and sleeve nut 9. The ring 4 has a hole therein, preferably equal to the outside diameter of the smaller pipe 7, which is to be connected to the larger pipe 8, the said larger pipe being of such diameter as to be threaded into the coupling 3, whereas the smaller pipe 7 is encircled by a sleeve nut 9 which sleeve nut has an external diameter equal to the internal diameter of the coupling 3, so that the said sleeve nut is threaded to engage the threads of the coupling 3. The end of the pipe 8 is shown as engaging the ring 4 and it is the purpose of the inventor to have pipe 8 bear against the ring 4 to such an extent as to hold it in contact with the packing 5 so that when the sleeve nut 9 is screwed in against the packing 5, said packing is forced in contact with the pipe 7 to such an extent as to effect a tight joint between the packing 5 and the said pipe 7 and preventing the escape of steam, water or the like between the sleeve nut and the pipe 7.

From an inspection of the drawing, it will be apparent that the principle can be utilized as has been heretofore stated in connection with relatively large and relatively small pipes which can be coupled together so long as the sleeve nut 9 fits the coupling 3 and the larger pipe is of a size to fit the said coupling. The sleeve nut may be of any configuration so long as it has means for engaging a tool such as a wrench for turning it and screwing it in the coupling, and I do not, therefore, wish to be limited with respect to the construction of the sleeve nut or ring or to the construction of the coupling so far as its configuration is concerned.

I claim—

In an expansion joint, a threaded coupling, a sleeve threaded into one end of said coupling, a pipe movably mounted in said sleeve, a ring movably mounted on said movably mounted pipe, packing positioned between said sleeve and said movable ring, and a pipe threaded into the opposite end of said coupling and adapted to normally abut said ring, said last-mentioned pipe being adjustable with respect to said sleeve to materially alter the length of said last-mentioned pipe by a corresponding opposite adjustment of said sleeve.

In testimony whereof, I affix my signature in the presence of two witnesses.

CRITTENDEN R. SPEIGHT.

Witnesses:
   J. M. MYERS,
   C. C. BRANCH.